United States Patent
Haering et al.

(10) Patent No.: US 9,728,987 B2
(45) Date of Patent: Aug. 8, 2017

(54) SMART BATTERY WITH A SUPPLY VOLTAGE CONTROL CIRCUIT AND METHOD FOR MANUFACTURING THE BATTERY

(71) Applicant: EM MICROELECTRONIC-MARIN SA, Marin (CH)

(72) Inventors: Pascal Haering, Aesch (CH); Pascal Maire, Liestal (CH); Fabien Malacarne, Neuchatel (CH); Cyril Marti, Lignieres (CH); Yves Theoduloz, Yverdon (CH)

(73) Assignee: EM MICROELECTRONIC-MARIN SA, Marin (CH)

( * ) Notice: Subject to any disclaimer, the term of this patent is extended or adjusted under 35 U.S.C. 154(b) by 341 days.

(21) Appl. No.: 14/695,400

(22) Filed: Apr. 24, 2015

(65) Prior Publication Data
US 2015/0349388 A1 Dec. 3, 2015

(30) Foreign Application Priority Data

May 28, 2014 (EP) .................................... 14170402

(51) Int. Cl.
*H02J 7/00* (2006.01)
*H01M 2/02* (2006.01)
*H01M 10/42* (2006.01)

(52) U.S. Cl.
CPC ......... *H02J 7/0042* (2013.01); *H01M 2/0222* (2013.01); *H01M 10/4257* (2013.01); *H01M 2010/4271* (2013.01); *Y10T 29/49112* (2015.01)

(58) Field of Classification Search
USPC ....................................................... 320/128
See application file for complete search history.

(56) References Cited

U.S. PATENT DOCUMENTS

| | | | |
|---|---|---|---|
| 5,637,418 A * | 6/1997 | Brown | ................ H01M 2/0207 429/127 |
| 6,074,775 A * | 6/2000 | Gartstein | ................ H01M 2/12 429/53 |
| 6,198,250 B1 | 3/2001 | Gartstein et al. | |
| 6,593,669 B1 | 7/2003 | Lemaire et al. | |
| 2009/0186169 A1 | 7/2009 | Shacklette et al. | |
| 2011/0165452 A1 | 7/2011 | Ahn | |

OTHER PUBLICATIONS

European Search Report of European Patent Application No. EP 14 17 0402 dated Nov. 5, 2014.

* cited by examiner

*Primary Examiner* — Robert Grant
(74) *Attorney, Agent, or Firm* — Sughrue Mion, PLLC (57) ABSTRACT

The smart battery (1) includes an electronic module provided with an electronic circuit (8) for controlling the supply voltage, which is disposed in a case having a cover (2) as the external negative terminal, fixed to a cup (3), as the external positive terminal. A first chemical substance (4) as the anode and a second chemical substance (5) as the cathode, are inside the case. The electronic module includes a printed circuit board (7) having a first face with conductive paths, connected to the electronic circuit, and a second insulating face fixed to the second chemical substance. The electronic circuit is connected at output to a first connection pad connected to the cup. The electronic circuit is connected to the chemical substances by a second connection pad on a first tab (7') and by a third connection pad on a second tab (7") folded at 180° on the second face of the printed circuit board.

30 Claims, 6 Drawing Sheets

SMART BATTERY WITH A SUPPLY VOLTAGE CONTROL CIRCUIT AND METHOD FOR MANUFACTURING THE BATTERY

This application claims priority from European Patent Application No. 14170402.3 of May 28, 2014, the entire disclosure of which is hereby incorporated herein by reference.

FIELD OF THE INVENTION

The invention concerns a smart battery, which is provided with an electronic circuit for controlling the supply voltage.

The invention also concerns a method for manufacturing a smart battery.

BACKGROUND OF THE INVENTION

In a smart battery design, an electronic supply voltage control circuit is integrated in the battery structure. Such an electronic circuit may include an end-of-life detector (EOL), an oscillator stage, a power control unit, or a communication interface. The electronic circuit also includes a DC-DC converter between the external positive terminal and the internal positive terminal. This DC-DC converter is powered on continuously or when the supply voltage is close or equal to an end-of-battery life threshold (EOL). This may be a Boost converter or a Buck converter. This makes it possible to extend battery life while supplying a sufficient supply voltage above a minimum limit. The battery may also be of the rechargeable type.

As mentioned above, reference may be made to U.S. Pat. No. 6,198,250 B1 which discloses a smart battery or cell of this type, which includes a controller circuit. The controller circuit is connected to the cell or battery supply terminals. The controller circuit makes it possible to extend battery life. To achieve this, the controller circuit includes a DC-DC converter clocked by an oscillator to convert the battery or cell voltage into an output voltage, which may be higher than a cutoff voltage or an end-of-battery-life voltage. The converter may be started as soon as the battery voltage reaches an end-of-battery-life voltage threshold in order to extend battery life.

According to FIG. 5B of U.S. Pat. No. 6,198,250 B1, the controller circuit is connected in a central position to the back cover of the battery, which forms the negative terminal of the battery, and to one of the electrochemical substances defining a negative pole. The controller circuit is connected by an input terminal to one of the electrochemical substances defining an internal positive pole by means of an electrical connecting tab. The controller circuit is connected by an output terminal to a wall defining an external positive battery terminal by means of another electrical connecting tab. An insulator must also be provided between the controller circuit and the electrochemical substances. The controller circuit arrangement occupies a relatively large space in the battery structure, which constitutes a drawback. Such an arrangement of the controller circuit does not easily allow it to be arranged in a battery of smaller dimensions, that is to say in a battery of smaller dimensions than an AAA battery.

SUMMARY OF THE INVENTION

It is therefore an object of the invention to provide a smart battery, which is provided with an electronic module with an electronic supply voltage control circuit and can be fitted to a battery with a conventional structure of small dimensions.

To this end, the invention concerns a smart battery provided with an electronic module with an electronic supply voltage control circuit, said electronic module being arranged in a case structure, which includes a cup made of electrically conductive material and a cover made of electrically conductive material, said cover being fixed to the cup by means of a sealing gasket, the cup defining an external positive terminal of the battery, whereas the cover defines an external negative terminal of the battery, the battery further including inside the case structure, a first chemical substance as the anode, connected to a second chemical substance as the cathode, wherein the electronic module includes a printed circuit board having a first face with a layer of conductive paths, the electronic circuit being mounted and connected to conductive paths on the first face, and a second insulating face fixed to or in contact with one of the chemical substances, wherein the electronic circuit is connected, from an output terminal, to at least a first electrical connection pad on the first face of the printed circuit board by at least a first conductive path, the first electrical connection pad being connected directly to the cup or to the cover, wherein the electronic circuit is also connected to at least a second electrical connection pad by at least a second conductive path, said second electrical connection pad being electrically connected to the first chemical substance defining an internal negative terminal, and which is connected to the cover, if the first connection pad is connected directly to the cup, and wherein the electronic circuit is also connected to at least a third electrical connection pad by at least a third conductive path, said third electrical connection pad being electrically connected to the second chemical substance defining an internal positive terminal, which is connected to the cup, if the first connection pad is connected directly to the cover.

Specific embodiments of the smart battery are defined in the dependent claims 2 to 24.

One advantage of the smart battery lies in the fact that all the electronic components can be integrated in a standard battery structure of small dimensions. The printed circuit board carrying the electronic circuit only has conductive paths on a first face, with a second insulating face capable of being secured to one or other of the chemical substances.

Advantageously, the electronic circuit is connected from an output terminal to one or more first electrical connection pads on the first face of the printed circuit board by one or more conductive paths. The first connection pad or pads are preferably directly connected to the cup as the external positive battery terminal. The electronic circuit is also connected to two chemical substances by means of one or more second and third connection pads by conductive paths. Preferably, the second connection pads are disposed on tabs fixed to support heels of an insulating support and the third connection pads are disposed on other tabs folded at 180° and connected to the second chemical substance. The second connection pads contact an inner wall of the cover, which is connected to the first chemical substance.

To this end, the invention therefore concerns a method for manufacturing a smart battery, the method including the steps consisting in:

mounting and electrically connecting the electronic circuit on a first face of the printed circuit board, which includes a layer of conductive paths, at least a first conductive path connecting an output terminal of the electronic circuit to at least a first electrical connection pad, at least a second conductive path connecting an earth terminal of the electronic circuit to at least a second electrical connection pad, and at least a third conductive path connecting an input terminal of the electronic circuit to at least a third electrical connection pad, fixing or placing in contact a second insulating face of the printed circuit board on one of the first and second chemical substances, which are secured to each other, electrically connecting the second electrical connection pad to the first chemical substance, electrically connecting the third electrical connection pad to the second chemical substance, placing the assembly of the electronic module and the first and second chemical substances in the cup, mounting the cove, which includes a peripheral mounting edge, on the cup by inserting said peripheral edge into an opening in the cup, the first electrical connection pad being connected directly to the cup or to the cover, and folding down an edge portion of the cup towards the peripheral edge of the cover with the insertion of a sealing gasket to insulate the cover from the cup.

Particular steps of the manufacturing method are defined in the dependent claims 26 to 30.

BRIEF DESCRIPTION OF THE DRAWINGS

The objects, advantages and features of the smart battery provided with an electronic module with an electronic supply voltage control circuit and the method for manufacturing the same will appear more clearly in the following description made on the basis of at least one non-limiting embodiment, illustrated by the drawings, in which.

DETAILED DESCRIPTION OF THE INVENTION

In the following description, all the smart battery integrated components that are well known to those skilled in the art in this technical field will be described merely in a simplified manner.

Figure 1:
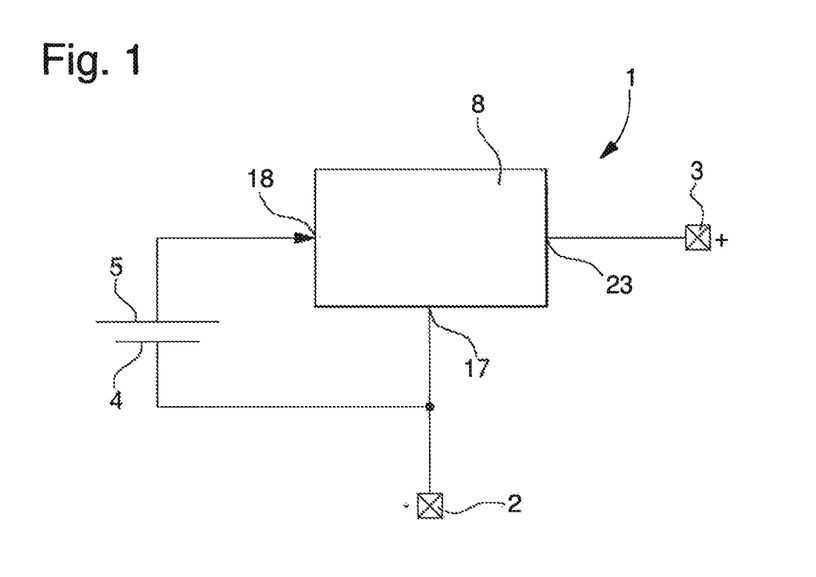
FIG. 1 shows a simplified view of the components of the smart battery provided with the electronic supply voltage control circuit according to the invention.

FIG. 1 shows a simplified view of the components of smart battery 1. This battery may take the form of a button cell or battery, as explained below, in order to be placed in a battery housing of an electrical instrument, such as a watch. This smart battery in the form of a button battery is used for electrically powering the electronic elements of the electrical instrument.

Smart battery 1 includes at least one electronic supply voltage control circuit 8. The electronic circuit is connected by one of its connection pads 18 to an internal positive terminal 5 of the battery which is defined as cathode 5, and, for operation, is also connected to an internal negative terminal 4 of the battery, which is defined as the anode. The internal negative battery terminal 4 may be directly connected to an external negative terminal 2, whereas the output of electronic circuit 8 may be directly connected to an external positive terminal 3. The electrical power supply of an electrical instrument is provided by the two external terminals 2 and 3 of the battery structure.

Battery cathode 5 and anode 4 are formed by two chemical substances connected to each other with the insertion of a spacer. These two chemical substances react chemically in an electrolyte medium to create electrical energy delivered by cathode 5 and anode 4. These chemical substances may be formed of Lithium (Li) to define anode 4 and Manganese Oxide ($MnO_2$) to define cathode 5.

Electronic circuit 8 may include, between cathode 5 and external positive terminal 3, a DC-DC converter, a processing or control unit connected to the converter, and an oscillator for controlling the DC-DC converter and the processing unit. In order to save battery power, the DC-DC converter may advantageously be a Buck converter, i.e. a voltage step down converter. The converter may operate continuously until the voltage supplied by the battery reaches an end-of-battery-life threshold (EOL). In that case, a direct connection is made between external positive terminal 3 and cathode 5, controlled by the processing unit.

The DC-DC converter of electronic circuit 8 may be configured according to a programme stored in a processing unit memory to behave like a voltage step up or voltage step down converter. It may also be configured to take account of a battery charging or discharging mode. In the case of battery charging, the DC-DC converter may be configured rather as a voltage booster, for example.

Since electronic circuit 8 must be disposed in a battery 1 of small dimensions, such as a button battery, there must be a reduced number of electronic components. The size of the battery structure may be on the order of 20 mm in diameter and 3.2 mm in thickness. It is advantageously possible to envisage integrating all of the electronic components in a single integrated circuit. In that case, it is necessary to use an oscillator with an integrated MEMS resonator or a fully integrated RC oscillator.

The structure of smart battery 1 will now be described with reference to FIGS. 2a, 2b, 3a, 3b, 4a and 4b. This battery 1 mainly includes a first chemical substance 4 and a second chemical substance 5, which are linked to each other by means of a spacer 6 and an electronic module 7, 8, 9 which includes electronic supply voltage control circuit 8. The electronic circuit is electrically connected to the first and second chemical substances.

The first chemical substance defines anode 4, whereas the second chemical substance defines cathode 5. The first and second chemical substances react chemically in a conventional electrolyte medium. This makes it possible to create electrical energy supplied between cathode 5, which is an internal positive battery terminal, and anode 4, which is an internal negative battery terminal. Advantageously, the first chemical substance 4 is Lithium (Li), while the second chemical substance 5 is Manganese Oxide ($MnO_2$).

Smart battery 1 further includes a case 2, 3 containing all the battery components. This case is formed of a cup 3 and a cover 2, which are both made of an electrically conductive material given that the cover is the external negative terminal and the cup is the external positive terminal of the battery. Cover 2 may be of generally cylindrical shape with an upper portion, which may be flat, and a cylindrical lateral wall, which ends in a peripheral mounting edge 13. Cup 3 includes a base and an edge portion 14 allowing it to be fixed in an insulated manner to the cover, particularly by a crimping operation.

Once the internal battery components are assembled from the base of cup 3, cover 2 is mounted on cup 3. The lateral wall with peripheral edge 13 of cover 2 is inserted into the opening in the edge portion 14 of cup 3. The components are held pressed between the lower surface of the upper portion of cover 2 and the bottom of cup 3. Subsequently, edge portion 14 is folded towards peripheral edge 13 of the outer surface of the cover wall by the crimping operation, for example with the insertion of a sealing gasket, shown in black in FIG. 2a. The sealing gasket ensures that cover 2 is electrically insulated from cup 3 and that the finished battery is sealed.

Figure 2A:
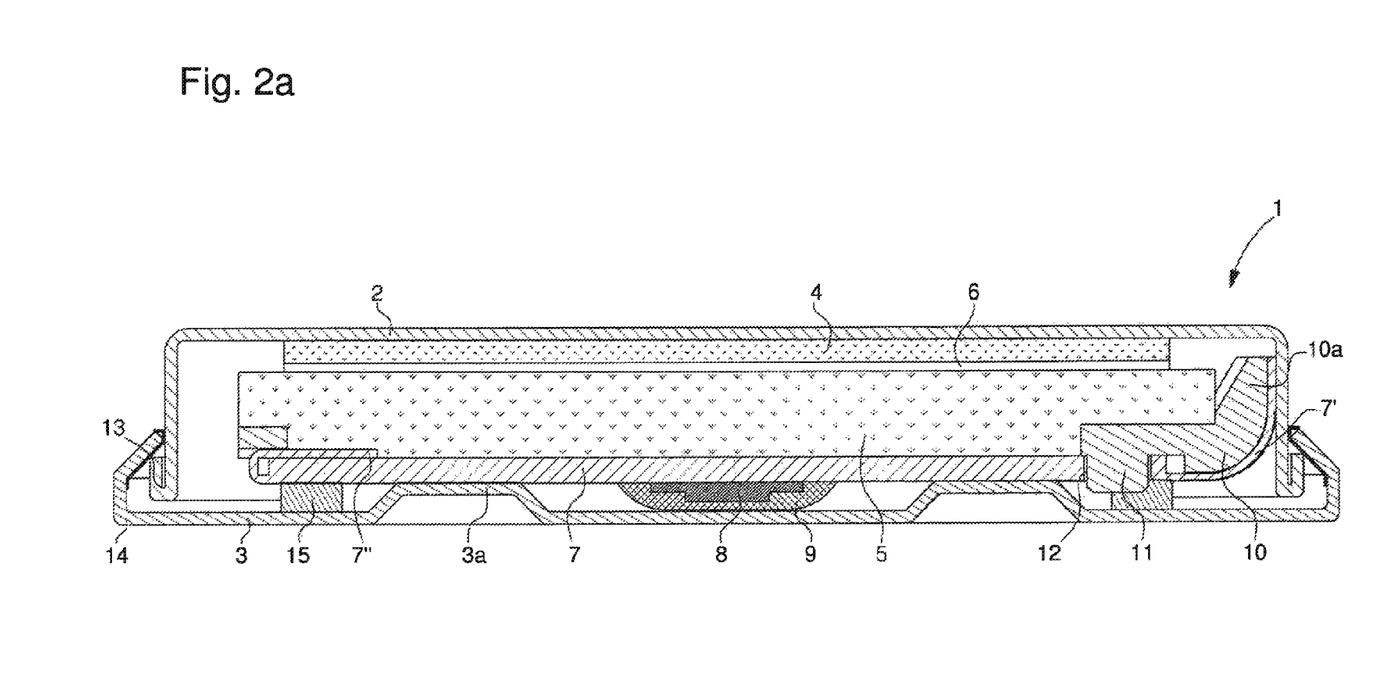
FIGS. 2a and 2b show diametric cross-sectional views of the smart battery according to the invention once assembled or in an exploded view.
Figure 2B:
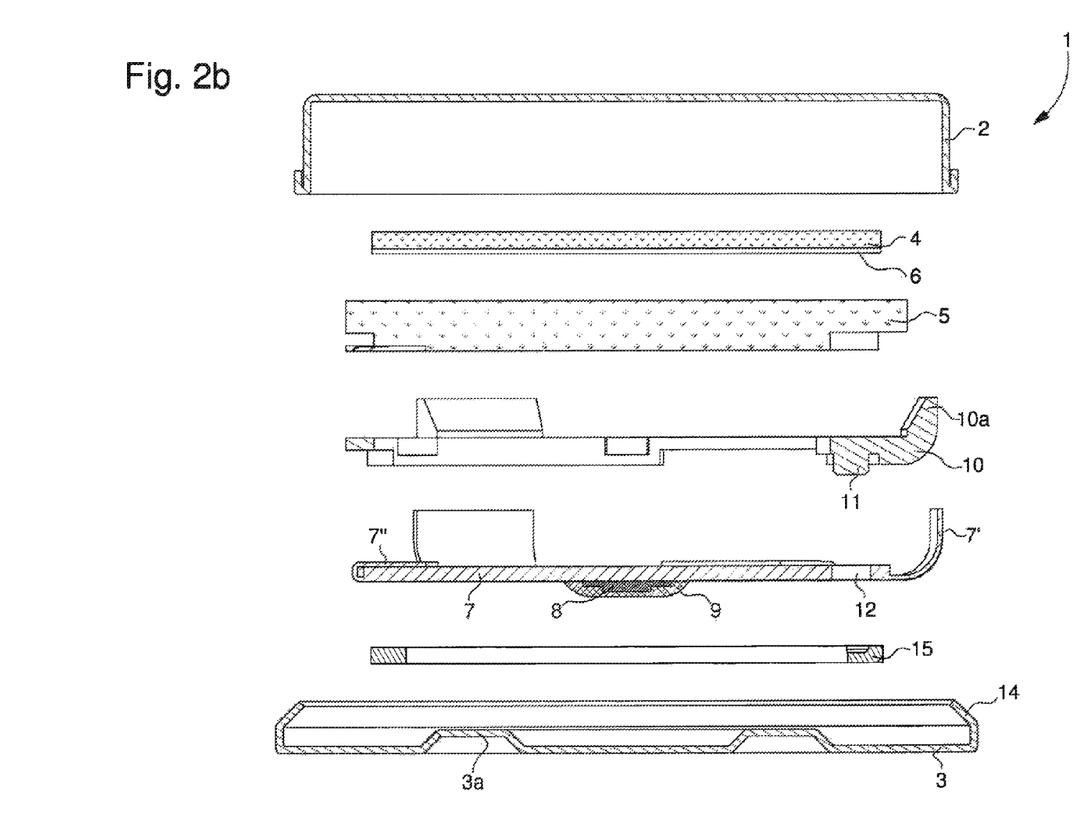

First chemical substance 4, which defines the battery anode, comes into direct contact with the inner surface of the upper portion of cover 2, which also forms external negative battery terminal 2. However, second chemical substance 5, which defines the battery cathode, is connected to electronic circuit 8, as explained below. The connection of the second chemical substance to the input terminal of electronic circuit 8 forms the internal positive terminal of smart battery 1.

Figure 4A:
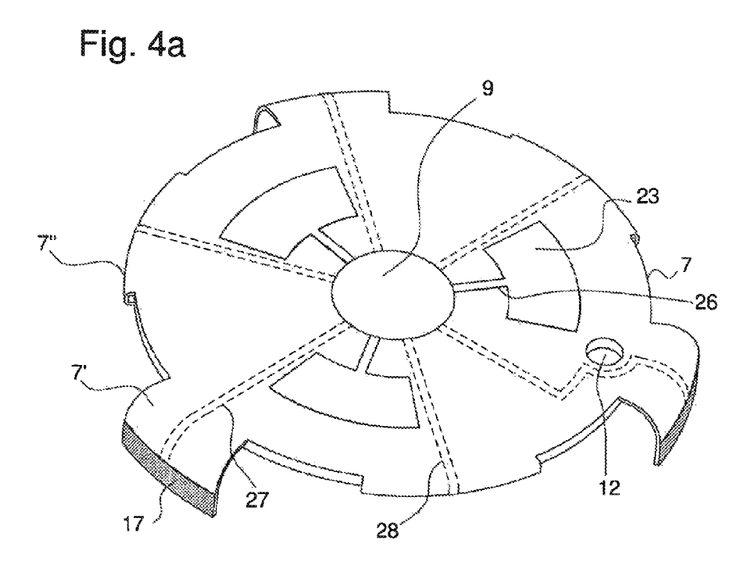
FIGS. 4a and 4b show three-dimensional, top and bottom views of the electronic module of the smart battery according to the invention.
Figure 4B:
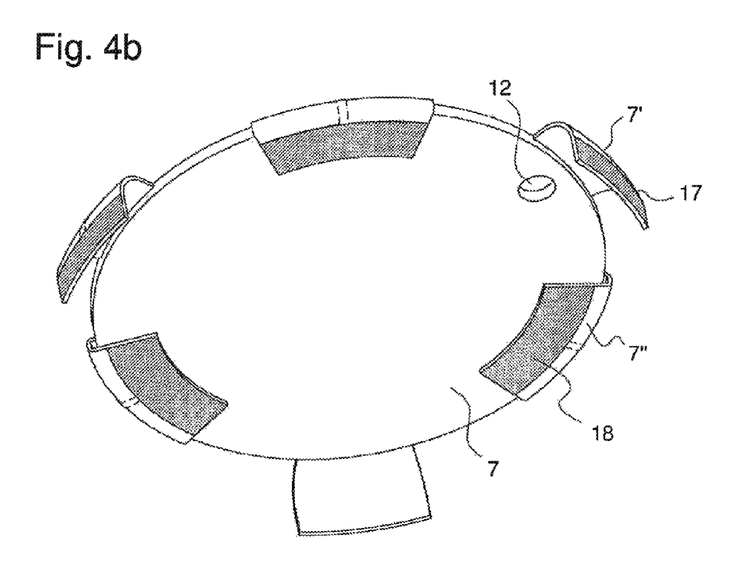

The electronic module carrying electronic circuit 8 is mounted on one face of second chemical substance 5. This electronic module includes a printed circuit board 7 on one face of which there is mounted and connected at least electronic circuit 8, which is encapsulated in an encapsulation material 9. Printed circuit board 7 preferably has only one first face with a layer of conductive paths 26, 27, 28 and an insulating layer on the layer of conductive paths. A second insulating face of printed circuit board 7 is fixed to or in contact with second chemical substance 5. Preferably, electronic circuit 8 is disposed in a central position on printed circuit board 7.

Electronic circuit 8 is connected to at least a first electrical connection pad 23 by at least a first conductive path 26 on the first face of printed circuit board 7. First conductive path 26 is connected to at least one output terminal of electronic circuit 8. Preferably, there may be provided at least three first electrical connection pads 23, which are evenly spaced and describe portions of a circle. These three first connection pads 23 are preferably identical and disposed midway between the centre and the periphery of printed circuit board 7. Consequently, there may also be provided, starting from electronic circuit 8, three first conductive paths 26, each for connecting the corresponding first connection pad 23.

Figure 3A:
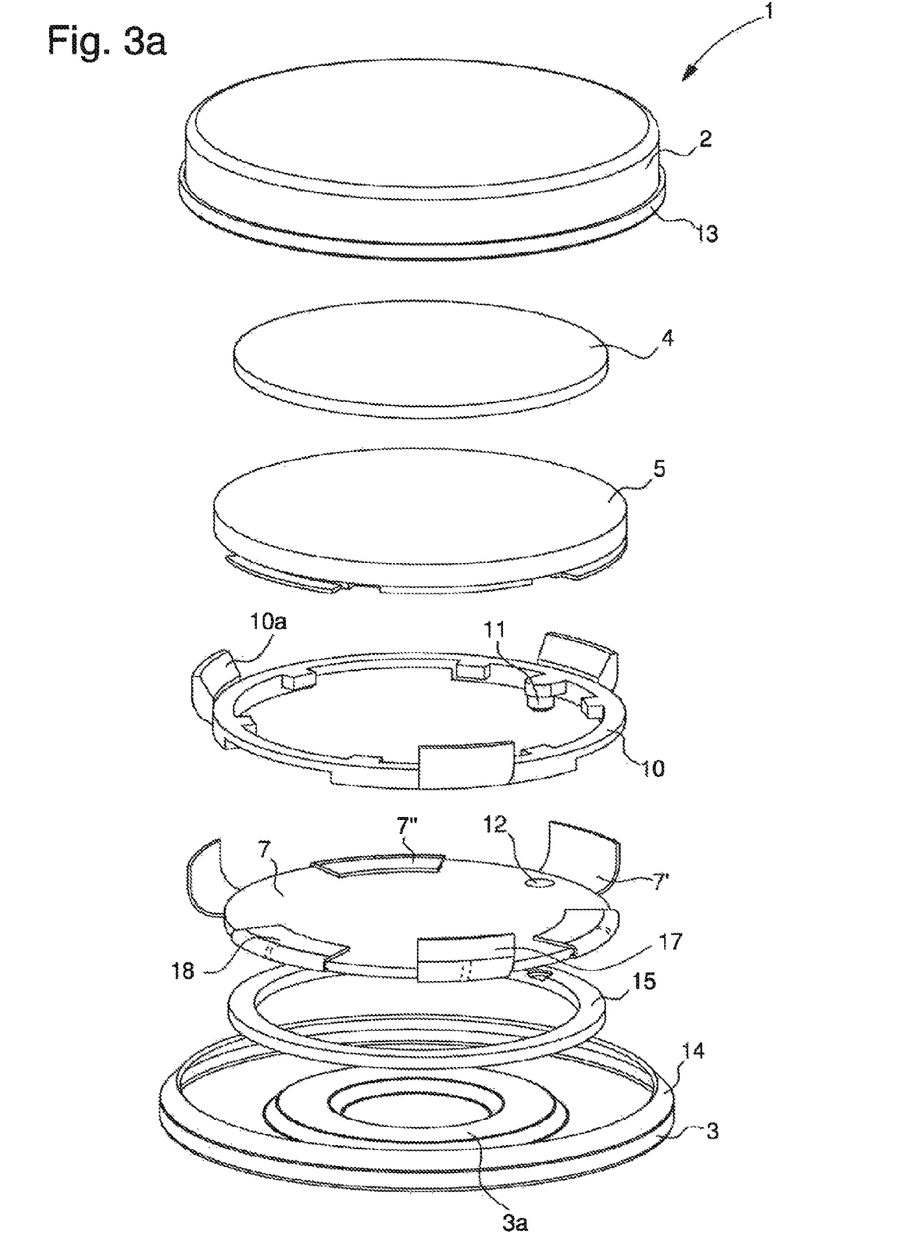
FIGS. 3a and 3b show three-dimensional, exploded, top and bottom views of the smart battery according to the invention.
Figure 3B:
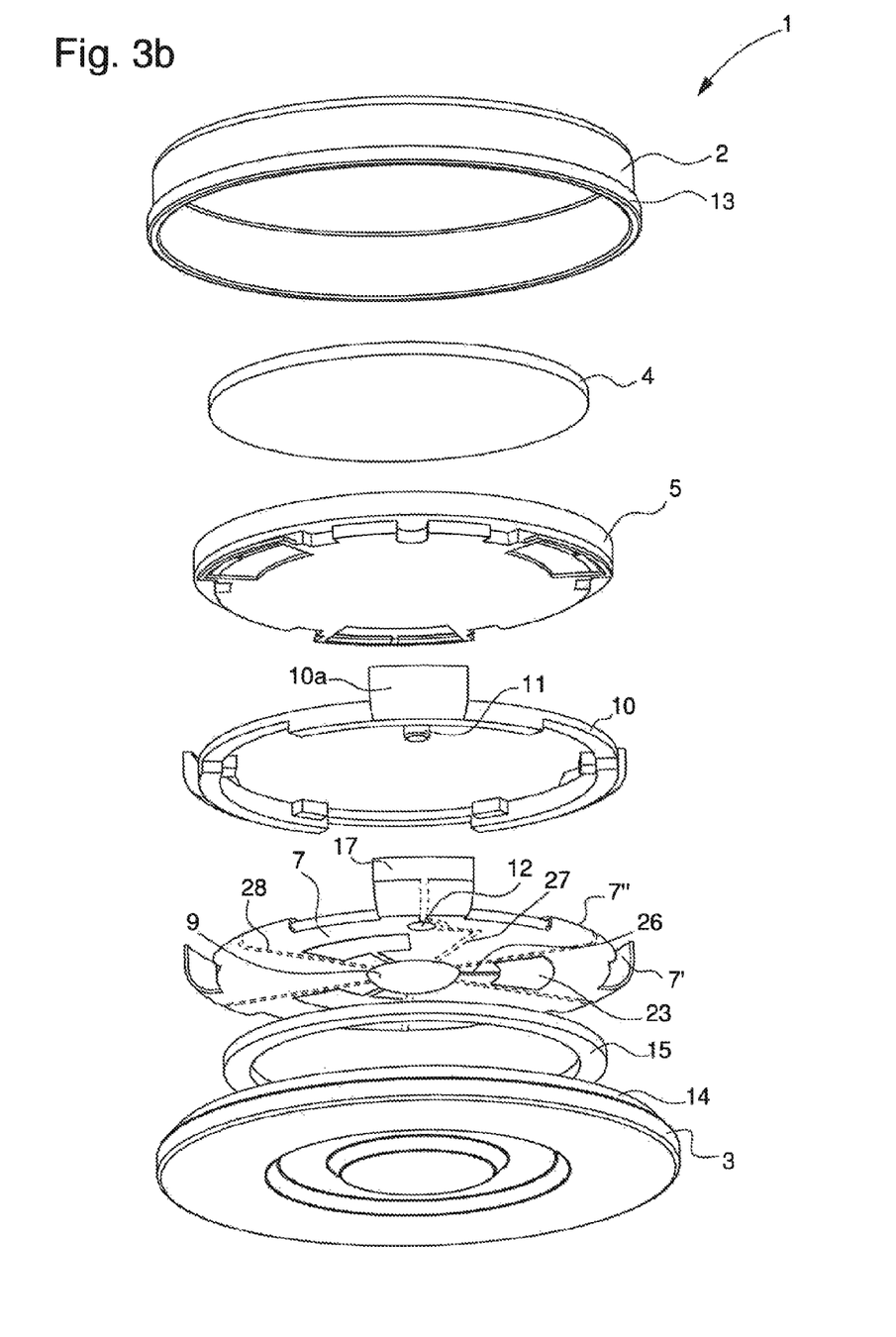

Each first connection pad 23 is intended to come into contact with an electrical connection area 3a of cup 3, which defines the external positive battery terminal. This connection area 3a may advantageously be of annular shape with an equivalent diameter to the diameter described by first connection pads 23. This connection area 3a extends towards the interior of the battery from the base of cup 3. Once all of the components are mounted between cover 2 and cup 3, this electrical connection area 3a bears on each first connection pad 23 to establish an electrical connection. First connection pads 23 could also be welded to electrical connection area 3a.

Electronic circuit 8 is also connected to at least one second electrical connection pad 17 by at least one second conductive path 27. This second electrical connection pad 17 must be connected to the internal negative terminal, which is also external negative terminal 2, as explained below. This external negative terminal of the cover is in direct contact with first chemical substance 4, which defines the anode. Second conductive path 27 is connected to at least one earth terminal of electronic circuit 8. Preferably, three second electrical connection pads 17 and three second conductive paths 27 are provided, each connected to a corresponding second connection pad 17.

The three second connection pads 17 are preferably each disposed on a corresponding first tab 7' of printed circuit board 7. The three first tabs 7' extend outwards from the periphery, which may be circular, of printed circuit board 7. Preferably, they may have a curve for the connection of second connection pads 17 to the inner surface of the wall of cover 2. Preferably, the three first tabs of identical shape are arranged at the periphery, evenly spaced apart from each other, i.e. the centre of each first tab is separated by 120° from the centre of another adjacent first tab.

It is to be noted that the entire printed circuit board 7 may be rigid or flexible. It is possible to envisage that the securing base of printed circuit board 7, which carries electronic circuit 8, is rigid, while at least the three first tabs 7' may be flexible. Printed circuit board 7 is preferably a standard polyimide (PI) insulating substrate on which copper conductive paths are etched. An insulation or cover layer also made of polyimide (PI) is deposited on the copper layer to insulate all the conductive paths as shown by the dash line in FIG. 4a.

Electronic circuit 8 is also connected to at least a third electrical connection pad 18 by at least a third conductive path 28. This third electrical connection pad 18 must be connected to the internal positive terminal, which is in direct connection with second chemical substance 5 corresponding to the cathode, as explained below. The third conductive path 28 is connected to at least one input terminal of electronic circuit 8. Preferably, three third electrical connection pads 18 and three third conductive paths 28 are provided, each connected to a corresponding third connection pad 18.

The three third connection pads 18 are preferably each disposed on a corresponding second tab 7" of printed circuit board 7. The three second tabs 7" extend outwards from the circular periphery of printed circuit board 7, prior to folding. Each second tab is folded at 180° relative to the securing base of the printed circuit board and fixed to the second face of printed circuit board 7. After the second tabs have been folded and secured, each third connection pad 18 is arranged to electrically contact second chemical substance 5.

Preferably, the three second tabs 7" of identical shape are arranged at the periphery, evenly spaced from each other, i.e. the centre of each second tab is separated by 120° from the centre of another adjacent tab. Each second tab 7" is also evenly spaced between two neighbouring first tabs 7'. The periphery of printed circuit board 7 thus includes, alternately and evenly spaced, the three first tabs 7' and the three second tabs 7" for connection to the two chemical substances 4 and 5 with the second and third connection pads 17 and 18.

Like the three first tabs 7', the three second tabs 7" may be designed to be flexible to make them easier to bend and secure. Conversely, the securing base of printed circuit board 7 can be rigid.

Printed circuit board 7 is mounted on an insulating support 10, which may be made of plastic material. Printed circuit board 7 may be fixed, for example by adhesive bonding, to insulating support 10, which is also fixed or bonded at the periphery to second chemical substance 5. This insulating support may be generally of annular shape with a central opening for securing the second face of printed circuit board 7 to second chemical substance 5. For positioning printed circuit board 7 prior to securing it to the support, said insulating support 10 has a cylindrical lug 11 adapted for insertion into a hole 12 in printed circuit board 7. The hole is of equal or slightly larger diameter than the diameter of lug 11.

Insulating support 10 also has at its periphery at least one support heel 10a, and preferably three support heels 10a for supporting and securing the three first tabs 7'. The external securing surface of each support heel 10a corresponds to that of each first tab to be secured. Preferably, the external surface of each heel 10a is bent to make it easier to secure each tab 7' and to allow each second connection pad 17 to be slightly bent and contacted by friction on the inner surface of the wall of cover 2 during assembly of the battery components. This connection by friction of the second connection pads is made easier by fitting the three heels 10a at the periphery of insulating support 10.

A sealing ring 15 may also be provided, fixed to the base of cup 3 and surrounding annular connection area 3a. The first face with the insulating layer of printed circuit board 7 compresses the sealing ring to connect connection area 3a on first connection pads 23.

The different steps of the method for manufacturing smart battery 1 will now be explained. In preliminary steps, electronic circuit 8 is first of all mounted on a first face of printed circuit board 7, which includes one layer of non-intersecting conductive paths 26, 27, 28 and one insulation layer on the conductive path layer. Electronic circuit 8 is electrically connected in a conventional manner to the various conductive paths before the electronic circuit is encapsulated in an encapsulation material 9. The second tabs 7" of the printed circuit board are each folded at 180° and secured to the second insulating face of the printed circuit board. The third connection pads 18 are thus on the second face side for connection to second chemical substance 5, which defines the cathode.

Once the electronic module is finished, the first tabs 7' of the printed circuit board are bent and the second insulating faces of the first tabs are bonded onto the complementary-shaped support heels 10a of insulating support 10 and support lug 11 is inserted into positioning hole 12 of printed circuit board 7. The first face with insulated conductive paths of the printed circuit board is disposed on sealing ring 15, which is fixed on an inner side to the base of cup 3. This sealing ring may be made of adhesive material to allow the first face of the printed circuit board to be bonded to the sealing ring.

The second chemical substance 5, which defines the battery cathode, is fixed to insulating support 10 in contact with the second face of printed circuit board 7 and third connection pads 18. Before or after second chemical substance 5 is fixed to support 10, spacer 6 and first chemical substance 4 are assembled on second chemical substance 5.

Cover 2 is then mounted on cup 3 by pressing support heels 10a, on which are fixed the first tabs 7' bearing externally second connection pads 17. An electrical contact, particularly by friction, can then be established between the inner surface of the wall of cover 2 and connection pads 17. Guided by support heels 10a, the peripheral mounting edge 13 of the cover is inserted into the opening in the cup, pressing the inner spacer components of the battery.

Once cover 2 is positioned on cup 3, edge portion 14 is folded down towards peripheral edge 13 of the external surface of the cover wall. Performing this crimping operation compresses a sealing gasket between edge portion 14 and peripheral edge 13 to electrically insulate cover 2 from cup 3 and ensure the sealing of the finished battery.

From the description that has just been given, several variants of the smart battery provided with the electronic module with a supply voltage control circuit can be devised by those skilled in the art without departing from the scope of the invention defined by the claims. The connection to the two chemical substances of the electronic supply voltage control circuit on the printed circuit board can be accomplished in a different manner, for example by means of conductive connection lugs. The electronic circuit may be placed at the periphery of the printed circuit board and connection to the two chemical substances may be achieved by means of conductive holes through the printed circuit board. The first connection pads may come into contact with an electrical connection area of the cover, which defines the external negative terminal of the battery according to the layout of the connection arrangement of the electronic circuit. The second connection pads may directly contact the first chemical substance with the first tabs folded at 180° and the second face of the printed circuit board fixed to the first chemical substance. The connection area of the cover is of annular shape with an equivalent diameter to the diameter described by the first connection pads. The second face of the printed circuit board may be fixed or in contact with the first chemical substance, whereas the second chemical substance may be directly connected to the external positive terminal of the cup.

What is claimed is:

1. A smart battery, which includes an electronic module provided with an electronic circuit for controlling the supply voltage, said electronic module being arranged in a case structure, which includes a cup made of electrically conductive material and a cover made of electrically conductive material, said cover being fixed to the cup by means of a sealing gasket, the cup defining an external positive terminal of the battery, whereas the cover defines an external negative terminal of the battery, the battery further including inside the case structure, a first chemical substance as the anode, connected to a second chemical substance as the cathode, wherein the electronic module includes a printed circuit board having a first face with a layer of conductive paths, the electronic circuit being mounted and connected to conductive paths on the first face, and a second insulating face fixed to or in contact with one of the chemical substances, wherein the electronic circuit is connected, from an output terminal, to at least a first electrical connection pad on the first face of the printed circuit board by at least a first conductive path, the first electrical connection pad being connected directly to the cup or to the cover, wherein the electronic circuit is also connected to at least a second electrical connection pad by at least a second conductive path, said second electrical connection pad being electrically connected to the first chemical substance defining an internal negative terminal, and which is connected to the cover, if the first connection pad is connected directly to the cup, and wherein the electronic circuit is also connected to at least a third electrical connection pad by at least a third conductive path, said third electrical connection pad being electrically connected to the second chemical substance defining an internal positive terminal, which is connected to the cup, if the first connection pad is connected directly to the cover.

2. The smart battery according to claim 1, wherein an insulation layer is deposited on the layer of conductive path, leaving access to the first electrical connection pad for direct electrical connection to the cup or to the cover.

3. The smart battery according to claim 2, wherein the printed circuit board is flexible.

4. The smart battery according to claim 2, wherein the battery includes three first electrical connection pads.

5. The smart battery according to claim 4, wherein the three first electrical connection pads are identical and disposed midway between the centre and the periphery of the circular printed circuit board.

6. The smart battery according to claim 5, wherein the three first electrical connection pads are evenly spaced and describe portions of a circle.

7. The smart battery according to claim 6, wherein the three first electrical connection pads come into contact with an electrical connection area of the cup or of the cover, the electrical connection area being of annular shape and of equivalent diameter to the diameter described by the three first electrical connection pads.

8. The smart battery according to claim 1, wherein the electronic circuit is disposed in a central portion of the printed circuit board.

9. The smart battery according to claim 1, wherein the second electrical connection pad is disposed on a first tab of the printed circuit board.

10. The smart battery according to claim 9, wherein the first tab extends outwards from the periphery of the printed circuit board.

11. The smart battery according to claim 10, wherein the battery includes three second electrical connection pads, which are each disposed on a corresponding first tab of the printed circuit board.

12. The smart battery according to claim 11, wherein the three identically-shaped first tabs are disposed at the periphery of the circular printed circuit board, evenly spaced from each other, with the centre of each first tab separated by 120° from the centre of another adjacent first tab.

13. The smart battery according to claim 1, wherein the third electrical connection pad is disposed on a second tab of the printed circuit board.

14. The smart battery according to claim 13, wherein the second tab extends outwards from the periphery of the printed circuit board.

15. The smart battery according to claim 14, wherein the battery includes three third electrical connection pads, which are each disposed on a corresponding second tab of the printed circuit board.

16. The smart battery according to claim 15, wherein the three identically-shaped second tabs are disposed at the periphery of the circular printed circuit board, evenly spaced from each other, with the centre of each second tab separated by 120° from the centre of another adjacent second tab.

17. The smart battery according to claim 16, wherein each second tab is fixed to the second face of the printed circuit board, folded at 180° relative to a securing base of the printed circuit board, so as to electrically contact the second chemical substance.

18. The smart battery according to claim 1, wherein the battery includes three second electrical connection pads each disposed on a corresponding first tab of the printed circuit board and three third electrical connection pads each disposed on a corresponding second tab of the printed circuit board, and wherein the periphery of the printed circuit board therefore includes, alternately and evenly spaced, the three first tabs and the three second tabs for connection to the two chemical substances with the second and third electrical connection pads.

19. The smart battery according to claim 18, wherein the three first tabs and the three second tabs of the printed circuit board are made of flexible material.

20. The smart battery according to claim 18, wherein the printed circuit board is mounted on an insulating substrate of annular shape, which is fixed to one of the chemical substances, and wherein the second face of the printed circuit board is fixed to one of the chemical substances through an opening in the insulating support.

21. The smart battery according to claim 20, wherein the insulating support has at the periphery thereof three support heels for supporting and securing the three first tabs.

22. The smart battery according to claim 21, wherein the external securing surface of each support heel corresponds to that of each first tab to be secured, with one external surface of each heel being bent.

23. The smart battery according to claim 22, wherein the second electrical connection pads are connected directly to the cover, wherein the three third electrical connection pads, which are on the three second tabs folded and fixed onto the second face of the printed circuit board, are electrically connected to the second chemical substance, and wherein the three first electrical connection pads are connected directly to the cup.

24. The smart battery according to claim 1, wherein the electronic circuit, which is mounted and connected to conductive paths on the first face of the printed circuit board, is encapsulated in an encapsulation material, and wherein the electronic circuit includes a DC-DC converter, a processing unit connected to the converter, and an oscillator for controlling the DC-DC converter and the processing unit, said DC-DC converter being configured to step down the battery supply voltage until the voltage supplied by the battery reaches an end-of-life threshold.

25. A method for manufacturing a smart battery according to claim 1, the method including the steps consisting in:
mounting and electrically connecting the electronic circuit on a first face of the printed circuit board, which includes a layer of conductive paths, at least a first conductive path connecting an output terminal of the electronic circuit to at least a first electrical connection pad, at least a second conductive path connecting an earth terminal of the electronic circuit to at least a second electrical connection pad, and at least a third conductive path connecting an input terminal of the electronic circuit to at least a third electrical connection pad,
fixing or placing in contact a second insulating face of the printed circuit board on one of the first and second chemical substances, which are secured to each other,
electrically connecting the second electrical connection pad to the first chemical substance,
electrically connecting the third electrical connection pad to the second chemical substance,
placing the assembly of the electronic module and the first and second chemical substances in the cup,
mounting the cove, which includes a peripheral mounting edge,
on the cup by inserting said peripheral edge into an opening in the cup, the first electrical connection pad being connected directly to the cup or to the cover, and
folding down an edge portion of the cup towards the peripheral edge of the cover with the insertion of a sealing gasket to insulate the cover from the cup.

26. The manufacturing method according to claim 25, the method including, after mounting and electrically connecting the electronic circuit on the first face of the printed circuit board, the steps of:
mounting the printed circuit board on an insulating support of annular shape, fixing the insulating support to one of the chemical substances, and fixing the second face of the printed circuit board onto one of the chemical substances through an opening in the insulating support.

27. The manufacturing method according to claim 26, wherein the second electrical connection pad is disposed on a first tab, which extends outwards at the periphery of the printed circuit board, and the third electrical connection pad is disposed on a second tab which extends outwards at the periphery of the printed circuit board, wherein before or after the electronic circuit is mounted and electrically connected on the first face of the printed circuit board, the second tab is folded at 180° and fixed onto the second face of the printed circuit board, and wherein the third electrical connection pad comes into contact with the second chemical substance when the second face of the printed circuit board is fixed to the second chemical substance.

28. The manufacturing method according to claim 27, wherein the insulating support includes at the periphery thereof at least one support heel, wherein the second face of the first tab is bent and bonded onto the complementary-shaped support heel of the insulating support.

29. The manufacturing method according to claim 28, wherein three first tabs are provided with three second connection pads, and three second tabs with three third connection pads, the three first tabs and the three second tabs being evenly spaced and arranged alternately at the periphery of the printed circuit board, and wherein the insulating support includes three support heels evenly spaced at the periphery, wherein before or after the electronic circuit is mounted and electrically connected on the first face of the printed circuit board, the three second tabs are folded at 180° and fixed onto the second face of the printed circuit board, and wherein the second faces of the three first tabs are bent and bonded onto the corresponding support heel.

30. The manufacturing method according to claim 29, wherein before the cover is assembled, the first face of the printed circuit board is placed on a sealing ring, which is fixed, on an inner side, to the base of the cup, and wherein during assembly of the cover, an inner wall of the cover contacts the second connection pads, which are disposed on the first tabs fixed to the support heels, and an annular area of the base of the cup contacts the first electrical connection pad or pads.

* * * * *